United States Patent [19]

Chaux et al.

[11] Patent Number: 4,519,844
[45] Date of Patent: May 28, 1985

[54] WATER SOLUBLE BIOGUM COMPOSITIONS AND HYDROSOLS PREPARED THEREFROM

[75] Inventors: Jean-Bernard Chaux; Pierre Gagne, both of Tassin La Demi-Lune; Michel Garcia, Antony; Dominique Lespinasse, Jassans Riottier; Josiane Roussos, Neuilly sur Seine, all of France

[73] Assignee: Rhone-Poulenc Specialites Chimiques, Courbevoie, France

[21] Appl. No.: 460,771

[22] Filed: Jan. 25, 1983

Related U.S. Application Data

[63] Continuation of Ser. No. 442,004, Nov. 16, 1982, abandoned.

[30] Foreign Application Priority Data

Nov. 16, 1981 [FR] France .................. 81 21358

[51] Int. Cl.$^3$ ............................................. C08L 5/00
[52] U.S. Cl. ..................................... 106/209; 106/208; 252/315.3; 252/363.5
[58] Field of Search .................. 252/315.3, 363.5; 106/208, 209

[56] References Cited

U.S. PATENT DOCUMENTS

| | | | |
|---|---|---|---|
| 3,228,855 | 1/1966 | Cadmus et al. | 252/315.3 X |
| 3,578,499 | 5/1971 | Crotty et al. | 252/315.3 X |
| 3,640,826 | 2/1972 | Lang et al. | 524/45 X |
| 3,655,579 | 4/1972 | Crotty et al. | 252/315.3 |
| 3,801,502 | 4/1974 | Hitzman | 252/315.3 X |
| 4,299,790 | 11/1981 | Greenberg | 106/209 X |
| 4,357,260 | 1/1982 | Sandford et al. | 106/209 X |

*Primary Examiner*—Lucille M. Phynes
*Attorney, Agent, or Firm*—Burns, Doane, Swecker & Mathis

[57] ABSTRACT

Compositions of matter, desirably in powder form, adapted for ready dispersion/dissolution in an aqueous medium, and which rapidly provide maximum viscosity values therefor, are comprised of an intimate admixture of a water soluble biogum heteropolysaccharide, a dispersion/dissolution enhancing amount of a water donor material, and, advantageously, an anionic and/or nonionic surfactant.

25 Claims, 1 Drawing Figure

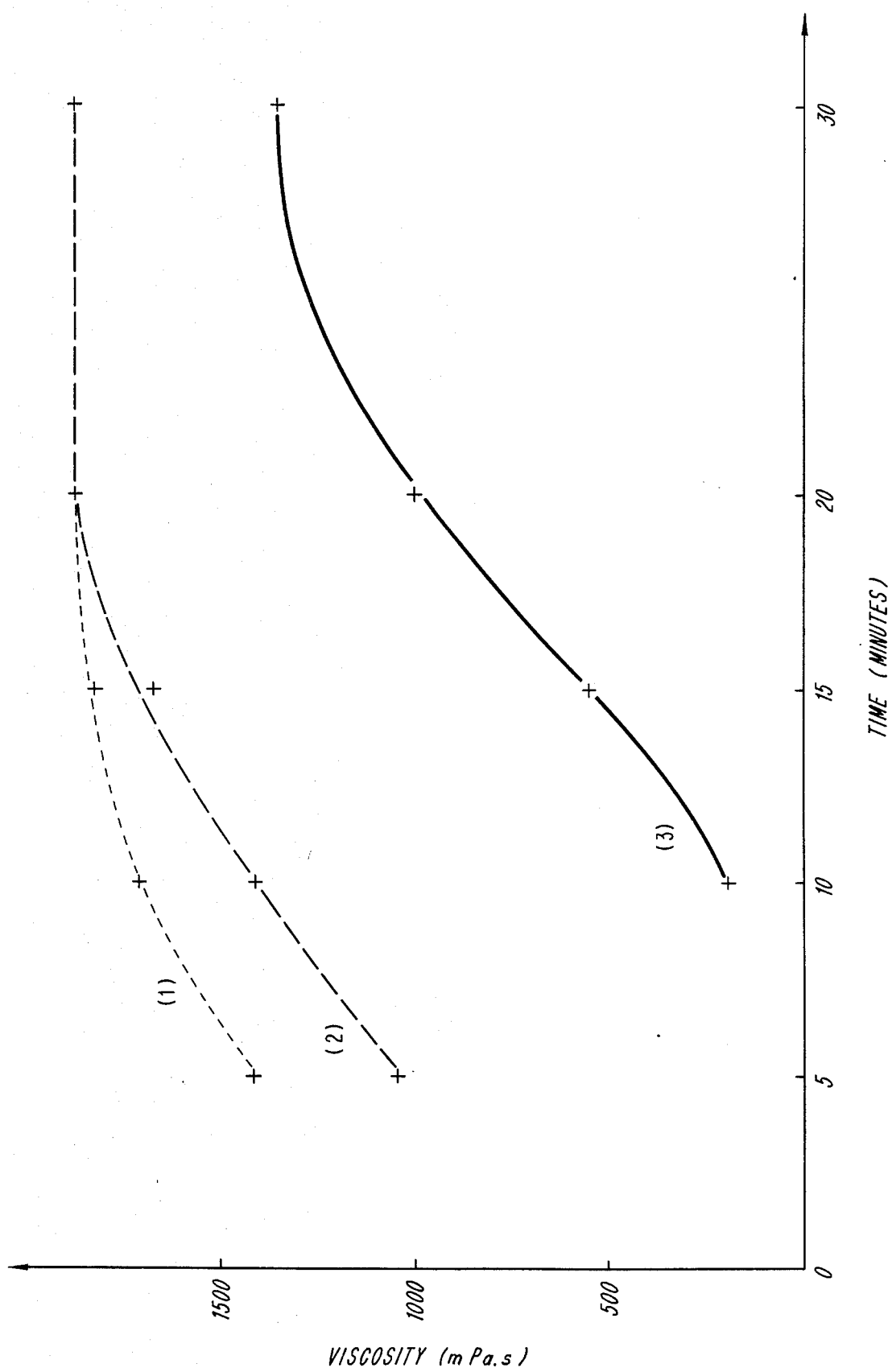

WATER SOLUBLE BIOGUM COMPOSITIONS AND HYDROSOLS PREPARED THEREFROM

CROSS-REFERENCE TO RELATED APPLICATIONS

This application is a continuation of our copending application, Ser. No. 442,004, filed Nov. 16, 1982, now abandoned. Cf. our copending application, Ser. No. 442,003, and Le Du et al copending application, Ser. No. 442,002, both filed concurrently herewith and both assigned to the asignee hereof.

BACKGROUND OF THE INVENTION

1. Field of the Invention

The present invention relates to novel compositions of matter comprised of a water soluble biogum, to process for the formulation thereof, and to the utilization of such compositions in the preparation of various hydrosols therefrom. More especially, this invention relates to compositions of matter adapted for enhanced, complete and effective dissolution in an aqueous medium, comprised of a biogum of a class of heteropolysaccharides of microbial origin, and more particularly comprised of a Xanthan gum.

By "biogum" or "heteropolysaccharide of microbial origin", there is intended an exocellular linear polymer of high molecular weight, in excess of one million, obtained by the fermentation of a carbohydrate by the action of bacteria of the genus Xanthomonas or Arthrobacter, or of fungi of the genus Sclerotium.

And "Xanthan gum" is intended to connote a polysaccharide produced by the fermentation of a carbohydrate with bacteria of the genus Xanthomonas.

Xanthan gum is a heteropolysaccharide having a molecular weight in excess of $10^6$. It contains D-glucose, D-mannose and D-glucuronate in the molar ratios of 2.8/2.0/2.0. It is partially acetylated with approximately 4.7% of acetyl radicals. It additionally contains approximately 3% of pyruvate radicals attached to a single lateral chain of the D-glucopyranosyl matrix as a ketal.

Finally, the term "sol" is intended to connote a colloidal solution of the biogum.

2. Description of the Prior Art

Certain of the biogums, by virtue of their viscosity and rheology, are useful as thickening agents for aqueous systems in numerous fields of application. Thus, Xanthan gum, for example, has to date been employed in fields as varied as construction, paints, textiles, cosmetics, petroleum exploitation, paper, the food industry, water treatment, phytosanitation, etc.

For many applications, it is necessary to convert the biogum to the form of an aqueous solution thereof. However, it is a disadvantage of most of the water soluble gums that they are quite difficult to solubilize. In attempting the very rapid hydration thereof, the particles or grains in contact with water are surrounded with a thin gelatinized film and they agglomerate. These agglomerates or floccules, surrounded by partially swollen polymers on the surface thereof, disintegrate and dissolve only with difficulty.

It has been proposed to improve the dispersibility and solubility of Xanthan gum by chemical reaction with glyoxal (French Patent No. 2,371,462).

This prior art process, however, requires a special treatment of the gum. Thus, serious need exists in this art for improved means to facilitate the dissolution of the otherwise difficultly dissolved/dispersed biogums.

SUMMARY OF THE INVENTION

Accordingly, a major object of the present invention is the provision of improved means for accelerating the dispersion of biogums in water and to increase the rate of dissolution thereof and thereby increase the speed of obtainment of high viscosity sols therefrom, by compounding certain additives therewith, while at the same time preserving the rheological properties of the biogum.

Another object of the invention is the provision of the subject biogums in a readily manipulated powder form, which dissolves well and swells rapidly in water.

Yet another object of the invention is to provide for the aforesaid desiderata by presenting the biogum in the form of powdery compositions having the highest content of the active biogum substance.

Briefly, the present invention features compositions of matter comprised of water soluble biogums, which compositions are adapted to facilitate dispersion and dissolution of the biogum component by having incorporated therein, or also being comprised of, an additive adapted to introduce a certain content of water thereto, or "water donor", or an additive adapted to itself sorb and retain water from an external aqueous environment.

DETAILED DESCRIPTION OF THE INVENTION

More particularly according to this invention, the subject biogums are produced by fermenting a carbohydrate by the action of bacteria of the genus Xanthomonas or Arthrobacter, or by fungi belonging to the genus Sclerotium.

Representative species of the bacteria or fungi that may be used for the production of these biogum heterosaccharides are, for example: *Xanthomonas begoniae, Xanthomonas campestris, Xanthomonas carotea, Xanthomonas hederae, Xanthomonas incanae, Xanthomonas malvacearum, Xanthamonas papavericola, Xanthomonas phaseoli, Xanthomonas pisi, Xanthomonas vasculorum, Xanthomonas vesicatoria, Xanthomonas vitians, Xanthomonas pelargonii, Arthrobacter stabilis, Arthrobacter viscosus, Sclerotium glucanicum, Sclerotium rolfsii*, and the like.

The species particularly suitable for the aforesaid type of fermentation are *Xanthomonas begoniae, Xanthomonas campestris, Xanthomonas incanae* and *Xanthomonas pisi.*

The species *Xanthomonas campestris* is especially suitable for the production of the subject biogums.

And it is of course possible to ferment a very wide variety of carbohydrates with the microorganisms belonging to the aforenoted genera in order to produce the heteropolysaccharide biogums useful in the compositions of the invention. Exemplary carbohydrates that may be employed include glucose, sucrose, fructose, maltose, lactose, soluble starch, corn starch, potato starch, and the like. The fermentation of the carbohydrate is typically effected in an aqueous medium containing up to 60 g/l glucide. It is also known that the fermentation medium may additionally comprise a source of phosphorus, a source of magnesium which is an enzyme activator, and a source of nitrogen which usually consists of "distillery solubles" (U.S. Pat. No. 3,000,790), bran or whole grain cereals, such as sorghum, soy beans or corn (U.S. Pat. No. 3,271,267), "corn steep" (U.S. Pat. No. 3,355,447) or inorganic nitrogen compounds, such as ammonium nitrate (U.S. Pat. No. 3,391,060) or ammonium phosphate (French Application No. 76/05933).

It too may be advantageous, prior to use, to subject the fermented mash to heating at a temperature ranging from 80° to 130° C. for from approximately 10 min to approximately one hour.

The heteropolysaccharide is separated from the fermenting mash and is used in the powder form. The separation of the heteropolysaccharide from the mash, possibly preheated as above-indicated, may be effected by conventional methods, for example, by precipitating it by addition to said mash of a lower alcohol, such as methanol, ethanol, isopropanol, tertiary butanol or acetone, or a mixture of such precipitating agents. Once precipitated, the heteropolysaccharide is separated, washed with the liquid of precipitation, and then dried and ground.

The heteropolysaccharide may also be subjected to subsequent purification operations; for this purpose, the known methods of the prior art may be used. Same consist, for example, of exposing the fermented mash, or the aqueous gel reconstituted from the heteropolysaccharide extracted from the mash, to centrifuging or filtration using diatomaceous earth, to the action of enzymes of protease type (French Pat. No. 2,264,077), or to sodium hydroxide (U.S. Pat. No. 3,729,460).

Preferably, that Xanthan gum produced by the fermentation of a carbohydrate with a pure culture of *Xanthomonas campestris*, is used consistent herewith; said biogum being extracted with isopropanol, and then dried and ground.

The water donor component of the subject compositions, or material providing the required fraction of water, is comprised of either bound water, or sorbed water, or water of crystallization. The first category of materials includes hydrated silica and alumina, either alone or in admixture, in a natural or synthetic form.

Thus, finely precipitated silica, in the form of fine particles having a large surface area, may be used. More particularly, silica particles having a BET surface ranging from 200 to 400 $m^2/g$ are employed, [the BET surface is determined by the method of Brunauer-Emmett-Teller, described in *Journal of the American Chemical Society*, 60, page 309 (February 1938)]. The ultimate particle size of the silica varies from 200 to 800 Å.

Further, hydrated silica gels are also suitable for use in the invention, in particular the following three principal types of gels: gels having a BET surface of 750–800 $m^2/g$, a pore volume of 0.37–0.40 $cm^3/g$, and an average particle diameter of 22–26 Å; gels having a BET surface of 300–350 $m^2/g$, a pore volume of 0.9–1.1 $cm^3/g$, and an average particle diameter of 120–160 Å; and gels having a BET surface of 100–200 $m^2/g$, a pore volume of 1.4–2.0 $cm^3/g$, and an average particle diameter of 180–220 Å.

Also useful consistent herewith are the dehydrated silica gels having a BET surface of 10 to 500 $m^2/g$ and a pore volume of 0.5 to 1.1 $cm^3/g$, with an average pore diameter ranging from 30 to 3,000 Å, preferably 600 to 3,000 Å. An autoclave treatment, described in French Pat. No. 2,093,176, enables providing the silica with the surface desired.

The water donor may also be an alumina hydrate in either of two states of hydration: $Al_2O_3.3H_2O$ and $Al_2O_3.H_2O$. Same may be employed in their natural form: hydrargillite or gibbsite, bayerite, nordstrandite, boehmite, diaspore; or in their synthetic form. Dried alumina gels of the boehmite type, having a surface of 200 to 400 $m^2/g$ and pore diameters of 50 to 100 Å, or various commercial products, in particular the α-trihydrate obtained via the Bayer process and having spheroidal particles with dimensions of 20 to 150 microns, too may be used.

All of the aforesaid compounds are products per se known to the art and are described, for example, in the Kirk-Othmar encyclopedia, *Encyclopedia Of Chemical Technology*, Volume 2.

Also useful are the hydrated silica aluminates in the form of argillas, or natural or synthetic zeolites.

Exemplary of the argillas suitable for use according to this invention, those belonging to the following groups are representative:

(i) Kaolin type: kaolinite, dickite, nakrite, anauxite, halloysite, endelitte;

(ii) Serpentine type: chrysolite, amesite, cronstedite, chamosite, garnierite;

(iii) Montmorillonite type: montmorillonite (bentonite), beidellite, nontronite, hectorite, saponite, sauconite;

(iv) Vermiculite or chlorite type; and (v) Attapulgite or sepiolite.

Representative natural zeolites are analcime, harmotome, phillipsite, gismondine, laumontite, erionite, offretite, levynite, faujasite, chabazite, gmelinite, natrolite, scolecite, mesolite, thomsonite, edingtonite, mordenite, ferrierite, epistilbite, heulandite, clinoptilolite, stilbite, brewsterite. Preferably, faujasite or mordenite is utilized.

Exemplary of the synthetic zeolites, the following commercial zeolites are representative: zeolites of type A, X, Y, L and those reproducing the structure of mordenite, chabazite and erionite.

The zeolites X and Y typically have a BET surface of 800 $m^2/g$ and a pore volume, respectively, of 0.36 $cm^3/g$ 0.34 $cm^3/g$.

The zeolites of type A, particularly of type 4A, have a BET surface of less than 10 $m^2/g$ and a pore volume of 0.30 $cm^3/g$.

For a detailed description of hydrated silica aluminates, reference is made to the literature: for example, for the argillas, to Kirk-Othmar, *Encyclopedia Of Chemical Technology*, Volume 5, and for the natural and synthetic zeolites, to D. W. Breck, *Zeolite Molecular Sieves*, A. Wiley-Interscience Publications (1974).

Also intended as water donors or materials incorporating water into the subject compositions are the hydrates of various inorganic or organic metal salts, in particular the alkali or alkaline earth metal salts.

More specifically, hydrates of the following salts or compounds, used either alone or in admixture or combination, may be used: carbonates, halides, nitrates, phosphates, silicates, sulfates, as well as the acetates, citrates, lactates, laurates and tartrates of sodium, potassium, calcium, magnesium, and the like.

As specific examples of the foregoing, the following are representative:

(1) Sodium acetate trihydrate: $NaC_2H_3O_2.3H_2O$ (2) Sodium carbonate heptahydrate: $Na_2CO_3.7H_2O$ (3) Sodium citrate pentahydrate: $Na_3C_6H_5O_7.5.5H_2O$ (4) Sodium orthophosphate dodecahydrate: $Na_3PO_4.12H_2O$ (5) Magnesium and sodium tartrate decahydrate: $Na_2Mg(C_4H_4O_6)_2.10H_2O$ (6) Sodium sulfate heptahydrate: $Na_2SO_4.7H_2O$ (7) Sodium sulfate decahydrate: $Na_2SO_4.10H_2O$
(8) Potassium and magnesium chloride hexahydrate: $KCl.MgCl_2.6H_2O$
(9) Potassium and magnesium sulfate hexahydrate: $K_2SO_4.MgSO_4.6H_2O$
(10) Calcium acetate dihydrate: $Ca(C_2H_3O_2)_2.2H_2O$
(11) Calcium carbonate hexahydrate: $CaCO_3.6H_2O$
(12) Calcium chloride hexahydrate: $CaCl_2.6H_2O$
(13) Calcium citrate tetrahydrate: $Ca_3(C_6H_5O_7)_2.4H_2O$
(14) Calcium lactate pentahydrate: $Ca(C_3H_5O_3)_2.5H_2O$
(15) Calcium nitrate trihydrate: $Ca(NO_3)_2.3H_2O$
(16) Calcium nitrate tetrahydrate: $Ca(NO_3)_2.4H_2O$
(17) Calcium sulfate dihydrate: $CaSO_4.2H_2O$
(18) Calcium tartrate tetrahydrate: $CaC_4H_4O_6.4H_2O$
(19) Magnesium acetate tetrahydrate: $Mg(C_2H_3O_3)_2.4H_2O$
(20) Magnesium chloride hexahydrate: $MgCl_2.6H_2O$
(21) Magnesium carbonate pentahydrate: $MgCO_3.5H_2O$
(22) Magnesium lactate trihydrate: $Mg(C_3H_5O_3)_2.3H_2O$
(23) Magnesium nitrate hexahydrate: $Mg(NO_3)_2.6H_2O$
(24) Magnesium orthophosphate octahydrate: $Mg_3(PO_4)_2.8H_2O$
(25) Magnesium sulfate heptahydrate: $MgSO_4.7H_2O$
(26) Magnesium tartrate pentahydrate: $MgC_4H_4O_6.5H_2O$
(27) Sodium carbonate decahydrate: $Na_2CO_3.10H_2O$ From among all of those water donors above-outlined, finely divided silicas, capable of adsorbing 2 to 3 times their weight in water, are preferably selected.

It too has now surprisingly been found that the compositions of the invention improve the dissolution of the water soluble biogum to a degree increasing with the original degree of difficulty of dissolution of the biogum.

It has also been determined that typically for the best results to be obtained consistent herewith, a third additive is included, such as a surfactant of the anionic and-/or nonionic type.

A preferred embodiment of this invention is thus defined by a composition of matter comprising a water soluble biogum having enhanced properties of dissolution, the same including, in addition to the water soluble biogum, a material incorporating water into the composition, or water donor, or material adapted to sorb and retain water and an anionic and/or nonionic surfactant.

For a description of the surfactants intended hereby, reference is made, for example, to Kirk-Othmar, *Encyclopedia Of Chemical Technology*, Volume 19, or to the different volumes in the series, *Surfactant Sciences Series*, Marcel Dekker, Inc.; Vol. 1: *Nonionic Surfactants*, by Martin J. Schick; Vol. 7: *Anionic Surfactants*, by Warner M. Linfield; or the work by McCutcheons: *Detergents and Emulsifiers*, International and North American Edition.

As examples of the anionic surface active agents that may be used, the following are representative:

(i) soaps of alkali metals, such as the sodium or potassium salts of saturated or unsaturated fatty acids having 8 to 24 carbon atoms, preferably having 14 to 20 carbons, or aminocarboxylic acid derivatives, such as sodium N-lauryl sarconisate, sodium N-acylsarconisate, and the like;

(ii) alkali sulfonates such as the alkyl sulfonates, aryl sulfonates or alkylaryl sulfonates; in particular alkyl sulfonates, such as, for example, the diesters of sulfosuccinic acid, such as sodium diethylhexylsulfosuccinate, sodium dioctylsulfosuccinate, alkylbenzenesulfonates of the formula $R_1-C_6H_4SO_3M_1$ wherein the radical $R_1$ is a linear or branched chain alkyl radical containing 8 to 13 carbon atoms, such as, for example, a nonyl, dodecyl or tridecyl radical and $M_1$ represents a sodium atom, a potassium atom, an ammonium radical, diethanolamine or triethanolamine; alkylnaphthalenesulfonates of the formula $(R)_{no} C_{10}H_{7-no}SO_3M_1$ wherein $no$ is a number ranging from 1 to 3 and the radical R is a linear or branched chain alkyl radical containing 1 to 4 carbon atoms, such as, for example, a methyl, isopropyl or isobutyl radical and $M_1$ is as above-defined; other sulfonates may also be employed, such as N-acyl, N-alkyltaurates of the formula $R_2-CO-N(R_2')-CH_1-CH_2-SO_3Na$ wherein $R_2$ is an alkyl radical having 11 to 18 carbon atoms and $R_2'$ is a methyl or ethyl radical, such as, for example, sodium N-oleoyl-N-methyltaurate or N-palmitoyl-N-methyltaurate; olefin sulfonates resulting from the sulfonation of the linear olefin fractions, $C_{14}$ to $C_{18}$;

(iii) sulfates and sulfate products: among the alkyl sulfates having the formula $R_3OSO_3M_1$, representative are those wherein the $R_3$ radical is a lauryl, cetyl or myristyl radical and $M_1$ is as above-defined; natural sulfate oils and fats; the disodium salt of sulfated oleic acid; polyoxyethylene sulfate fatty alcohols of the formula $R_4(O-CH_2-CH_2)_{n1} OSO_3M_1$ wherein $R_4$ is an alkyl radical containing 6 to 16 carbon atoms, such as, for example, a myristyl radical or a linear or branched chain alkyl radical, such as, for example, a hexyl, octyl, decyl or dodecyl radical, $n_1$ is the number of mols of ethylene oxide and varies from 1 to 4 and $M_1$ is as above-defined; polyoxyethylene alkylphenol sulfates having the formula $R_5-C_6H_4(O-CH_2-CH_2)_{n2} OSO_3M_1$, wherein $R_5$ is a linear or branched chain alkyl radical containing 8 to 13 carbon atoms, such as, for example, an octyl, nonyl or dodecyl radical, $n_2$ is the number of mols of ethylene oxide and varies from 1 to 6 and $M_1$ is as above-defined;

(iv) alkaline phosphates: the mono- and diesters of orthophosphoric acid or one of its salts which may be represented, for the alkyl phosphates, by the formula $(R_6O)PO(OM_2)_2$ and, for the dialkyl phosphates, by the formula $(R_6O)_2PO(OM_2)$ wherein $R_6$ is a linear or branched chain alkyl radical having 6 to 12 carbon atoms and $M_2$ represents a hydrogen atom, or a sodium or potassium atom; as an example of the radical $R_6$, n-hexyl, n-octyl, n-ethylhexyl, dimethylhexyl, n-decyl, dimethyloctyl, trimethylheptyl and trimethylnonyl are noted; the mono- or diesters of orthophosphoric acid, or salt thereof, polyoxyethyleneated, which may be represented, for the polyoxyethylene alkyl phosphates, by the formula:

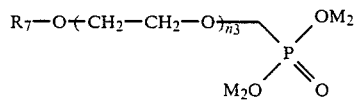

and, for the dialkyl polyoxyethylene phosphates, by the formula:

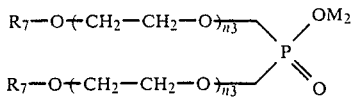

wherein R$_7$ represents a linear or branched chain alkyl radical having 6 to 12 carbon atoms, a phenyl radical, an alkylphenyl radical with the alkyl chain having from 8 to 12 carbon atoms, n$_3$ is the number of mols of ethylene oxide and varies from 2 to 8, and M$_2$ is as above-defined; as examples of the radical R$_7$, hexyl, octyl, decyl, dodecyl and nonylphenyl are representative.

Exemplary nonionic surfactants are the compounds obtained by condensation of an alkylene oxide with an organic compound, which may be aliphatic or alkylaromatic. Representative nonionic surfactants are:

(i) polyoxyethylene alkylphenols, for example, the products of the condensation of 5 to 25 mols of ethylene oxide per mol of alkylphenol, the alkyl radical of which being straight or branched chain and containing from 6 to 12 carbon atoms; in particular, nonylphenol condensed with approximately 10 to 30 mols of ethylene oxide per mol of phenol, dinonylphenol condensed with 15 mols of ethylene oxide per mol of phenol and dodecylphenol condensed with 12 mols of ethylene oxide per mol of phenol, are representative;

(ii) aliphatic polyoxyethylene alcohols resulting from the condensation of 5 to 30 mols of ethylene oxide with linear or branched chain fatty alcohols containing from 8 to 22 carbon atoms: for example, the product of condensation of approximately 15 mols of ethylene oxide with 1 mol of tridecanol or coprah alcohol; myristyl alcohol condensed with 10 mols of ethylene oxide;

(iii) fatty amides, such as, for example, the diethanolamide of fatty acids, or polyoxyethyleneated fatty acids, such as lauric acid or coconut oil;

(iv) polyoxyethylene and polyoxypropylene derivatives; illustrative of this type of surfactant are the well known products marketed under the trademark "PLURONICS". Same are obtained by the sequential addition of propylene oxide and ethylene oxide to a reactive hydrogen compound with a low molecular weight, such as, for example, propylene glycol.

In order to facilely incorporate the surfactant into the compositions of the invention, it is introduced in a solid, preferably powder form.

The surfactants are in the solid and, more frequently, in the liquid state. In the case of a liquid surfactant, it must first be deposited onto a powder support capable of sorbing and desorbing the liquid and which is chemically inert, insoluble or soluble. It may also be sorbed directly onto the powder consisting of the water donor, with water optionally being added thereto.

Preferably, a solid surfactant such as sodium alkylpropylnaphthalene sulfonate, in particular sodium diisopropylnaphthalene sulfonate, is utilized.

The proportions of the various, advantageously three components in the subject biogum compositions, are preferably as follows:

The amount of water in the compositions according to the invention, expressed as the ratio by weight of biogum/water, may vary over wide limits, from 6.5 to 1, preferably 2.5 to 1.

The lower limit is not critical. However, it is preferred that this ratio does not exceed 4.

The amount of water donor is defined as the ratio by weight of the water donor to water; it preferably ranges from 0.3 to 0.6, while it nonetheless may be selected within a larger range, from 0.3 to 2.6.

The amount of the surfactant employed, defined as the ratio of the weight of the surfactant to the total weight of the composition of the invention, may vary from 0 to 0.10. The upper limit is not critical, but there is no advantage in attaining weight ratios higher than 0.25. Preferably, the amount of surfactant is selected such that said ratio ranges from 0.03 to 0.07.

Examples of the subject compositions comprised of a water soluble biogum are as follows:

(1) 30 to 70% by weight water soluble biogum;
(2) 7 to 40% by weight of water donor;
(3) 0 to 10% by weight of an anionic and/or a nonionic surfactant; and
(4) 15 to 37% by weight of water.

Preferred compositions are the following:

(1) 50 to 60% by weight water soluble biogum;
(2) 8 to 15% by weight of water donor;
(3) 3 to 7% by weight of an anionic and/or nonionic surfactant; and
(4) 24 to 36% by weight of water.

Concerning the preparation of the compositions according to the invention, it varies slightly depending on whether or not the water component of any given composition is externally added or comprises water of crystallization, and depending on whether or not the surfactant is in the solid or liquid form.

The process for the preparation of the compositions according to the invention comprises mixing, in the dry state, the water donor, onto which water may be adsorbed, with the biogum and optionally adding thereto the anionic and/or nonionic surfactant.

The first operation, which features the impregnation of the water donor with water, entails the following materials: finely divided silica, dehydrated silica gels, alumina hydrates and silica aluminate hydrates. Progressively, under agitation, water is added to the water donor. This stage is omitted, if, as the water donor, hydrated silica gels or the hydrates of inorganic or organic salts are employed.

The water donor is in the form of a dry powder, even if it is impregnated with water, as aforesaid.

Subsequently, its admixture with the water soluble biogum is effected in a powder mixer of known type: free-falling, drum type mixer, vertical or horizontal screw mixers, horizontal Lodige type mixer, or the like.

The introduction of the surfactant, if it is a solid, is effected into the mixture of the water donor and the biogum.

If the surfactant is present in the form of a liquid, it is generally adsorbed onto the water donor, simultaneously with or successively to the adsorption of water, whereupon it is admixed with the biogum.

After all of the components are introduced, the mixing is continued. The duration of the operation is a function of the apparatus used and is easily determined by those skilled in the art, such that a homogeneous mixture is obtained.

The process of the invention provides compositions in the form of a powder having excellent storage stability.

Also according to the invention, sols are prepared from the aforementioned compositions of matter.

The preparation of said sols is effected simply by adding the powdered composition to the aqueous medium under agitation, by means of conventional agitator devices (anchor agitation, screw or turbine agitation, etc.).

The introduction of the composition of the invention into the water may take place rapidly, in a single fraction, without difficulty. It does not require any special precautions.

The quantity of the composition introduced is such that, typically, the concentration of the water soluble biogum in the sol varies from 0.2 to 2% by weight.

Agitation is then maintained until a constant viscosity results; usually, the duration of agitation ranges from 10 to 30 min.

By virtue of the formulation of a water soluble biogum in the form of the compositions of the invention, marked improvement in the dissolution of the biogum, together with an increase in the speed at which the viscosity of the resultant sol attains a maximum value, both ensue, especially when the biogum is dissolved under conditions of mild agitation. By way of example, the viscosity of a sol comprising 0.5% by weight Xanthan gum in city water having a hardness of 25° HT (or 100 mg/l $Ca^{++}$ ions) measured at 23° C. with a Brookfield Model LVT viscosimeter, at a velocity of 10 rpm using a No. 2 plunger, was compared with the viscosity of a sol having the same concentration in Xanthan gum, but prepared from a composition according to the invention containing:

(1) 60% by weight Xanthan gum;
(2) 8.75% by weight of a precipitated silica having a BET surface of 250 $m^2/g$;
(3) 5% by weight of sodium diisopropylnaphthalenesulfonate; and
(4) 26.25% by weight of water.

With the composition according to the invention, the maximum viscosity of the sol, namely, 1,800 mPa·s, was attained after only about 15 min, while the viscosity of the sol of the Xanthan gum alone was only 600 mPa·s after 15 min, and 1,300 mPa·s after 30 min, with the maximum viscosity not being attained until after at least one hour.

It will be seen that the sols obtained utilizing the compositions of the invention are perfectly stable under conventional storage conditions; compare the examples to follow.

In order to further illustrate the present invention and the advantages thereof, the following specific examples are given, it being understood that same are intended only as illustrative and in nowise limitative.

In said examples to follow, the heteropolysaccharide biogum employed was the Xanthan gum marketed by Societe Rhone-Poulenc under the commercial designation of Rhodopol 23, and having the following specifications:

| | |
|---|---|
| (i) Appearance | Cream colored powder |
| (ii) Apparent density, g/cm³ | 0.8 |
| (iii) Active material | 90% |
| (iv) Ash | 10% |
| (v) Moisture content | 10% |
| (vi) pH (1% sol in distilled water) | 7% |
| (vii) Brookfield LVT 30 M viscosity Needle No. 4 | 2,200–3,000 cps |
| (viii) Particle size: | |
| Particles <75μ | <30% |
| >297μ | <2% |

Also in the following examples, those operating conditions set forth immediately below were utilized in each example for the formulation of the compositions according to the invention and for the preparation of the sols therefrom, except as otherwise stated.

The procedure employed for the formulation of the subject compositions was as follows:

(i) Water was sorbed, if necessary, onto the water donor, in the amount indicated. For this purpose, the water was slowly poured under mild agitation into a beaker containing said water donor;

(ii) The water soluble Xanthan biogum was then added to the water impregnated water donor, and same were then intimately admixed;

(iii) Finally, the solid surfactant was added thereto; and (iv) The resulting composition was homogenized for one hour in a powder mixer.

The conditions for the preparation of the sols were as follows; in each experiment, 400 g of sol were prepared:

(i) Into a beaker equipped with a frame-type agitator rotating at a velocity of 100 rpm, 400 g water were introduced; said water being city or tap water having a hardness of 25° HT (100 mg/l $Ca^{++}$ ions);

(ii) The powdered composition was rapidly poured therein in the desired amount, with the extent of the addition being less than 30 sec; and (iii) The agitation was maintained until a constant viscosity resulted.

It should be noted that the solution test was made more difficult by reason of the mild conditions of agitation, thereby making it possible to observe the improvement in dispersibility; higher degrees of agitation would not be beneficial.

The agitator employed was a frame blade placed in the solution such that the upper part thereof was flush with the surface of the water, thereby aiding the wetting of the surface of the powder poured onto the water.

The following examples illustrate the different compositions of the invention, either with or without surfactant. The properties of the sols obtained with the compositions of the invention are compared with those of sols containing only the water soluble Xanthan biogum.

In all of the examples to follow, the percentages are expressed by weight.

EXAMPLES 1 and 2

(1) Preparation of compositions based upon Xanthan gum

The following compositions were formulated using Xanthan gum, a light precipitated silica as the water donor and the anionic surfactant, sodium diisopropylnaphthalene sulfonate (Example 1), optionally with a nonionic surfactant (Example 2) being added, the latter consisting of a nonylphenol condensed with 10 mols of ethylene oxide.

The characteristics and proportions of the various components of said compositions were as follows:

| | Composition 1 | Composition 2 |
|---|---|---|
| Xanthan gum (Rhodopol 23 | 33.3% | 20% |
| Precipitated silica (Tixosil 38A) | 22.2% | 30% |
| Sodium diisopropylnaphthalenesulfonate (Supragil WP) | 4.5% | 3% |
| Nonylphenol with 10 E.O. (Cemulsol NP 10) | — | 20% |
| City water | 40% | 27% |

Tixosil 38A is a precipitated silica having a BET surface of 250 m$^2$/g and a pore volume, of those pores varying in size from 400 Å to 2.5 $\mu$, of 1.80 cm$^3$/g of silica, and a moisture content at 105° C. of less than 7%.

Supragil WP is sodium diisopropylnaphthalenesulfonate, an anionic surfactant in the solid state. More precisely, it has the formula of $(C_3H_7)_{no}C_{10}H_{7-no}SO_3Na$ with $no=1.8$.

Cemulsol NP 10 is a nonylphenol condensed with 10 mols of ethylene oxide; it is a liquid, nonionic surfactant.

The preparation of the subject compositions was carried out under the aforedescribed conditions, except that the liquid surfactant was adsorbed onto the silica under the same conditions as the water, prior to the addition of the Xanthan gum.

(2) Preparation of the sols

The sols also were prepared under the aforedescribed conditions, with the following concentrations by weight of commercial Xanthan gum, i.e., at a moisture content of about 10%: 0.2%; 0.3%; 0.5%; 1%.

A series of control experiments was also carried out wherein only the Xanthan gum was utilized.

The operating conditions for the preparation of the sols were those above-outlined, except that the speed of agitation was 400 rpm, instead of 100 rpm.

(3) Study of the sols (a) Viscosity measurements:

The viscosity of the sols prepared from the compositions of the invention and from the Xanthan gum alone was a function of the concentration of the biopolymer therein; it was determined for concentrations of 0.2%, 0.3%, 0.5% and 1% by weight of the Xanthan gum.

The viscosity measurements were taken at 23° C. with the aid of a Brookfield Model RV viscosimeter, and a velocity of 10 rpm, with No. 2 plungers for the concentrations 0.2%, 0.3% and 0.5% and a No. 3 plunger for the 1% concentration.

Measurements were recorded after 5, 10, 30 and 45 min of agitation, after a quiescent period of 24 hours.

The results obtained for the Compositions 1 and 2 of Examples 1 and 2 and for the Xanthan gum of Experiment A are respectively reported in Tables I and II. The appearance of the product sols is also reported.

TABLE I

Measurements of viscosities in mPa.s (BROOKFIELD Model RV Viscosimeter - 10 rpm - Plungers Nos. 2 and 3) Appearance of the solutions

| REFERENCES | COMPOSITION 1 | | | | COMPOSITION 2 | | | |
|---|---|---|---|---|---|---|---|---|
| Concentration in Xanthan gum | 0.2% | 0.3% | 0.5% | 1% | 0.2% | 0.3% | 0.5% | 1% |
| Duration of agitation | | | | | | | | |
| 5 minutes | 170 | 685 | 1840 | 5690 | 15 | 95 | 1165 | 7260 |
| 10 minutes | 295 | 770 | 1905 | 5740 | 205 | 845 | 2240 | 7100 |
| 30 minutes | 310 | 775 | 1930 | 5950 | 360 | 820 | 2070 | 7180 |
| 45 minutes | 320 | 775 | 1950 | 5960 | 380 | 830 | 2020 | 6720 |
| After a quiescent period of 24 hours | 325 | 750 | 1970 | 6000 | 340 | 800 | 2090 | 6600 |
| Observations after 5 minutes | Good dispersion; presence of a few, small floccules. | | | | Very good dispersion; suspension of fine, white particles. | | | |
| Observations after 10 minutes | Still some very small floccules. | | | | Formation of a light foam. | | | |
| Observations after 30 minutes | Homogeneous sol; no silica visible in suspension. | | | | Formation of a light foam. | | | |

TABLE II

Measurements of viscosities in mPa.s (BROOKFIELD Model RV Viscosimeter - 10 rpm - Plungers Nos. 2 and 3) Appearance of the solutions

| REFERENCE | XANTHAN GUM | | | |
|---|---|---|---|---|
| Concentration in Xanthan gum | 0.2% | 0.3% | 0.5% | 1% |
| Duration of agitation | | | | |
| 5 minutes | not measurable | not measurable | not measurable | not measurable |
| 10 minutes | 145 | 400 | 1300 | 3310 |
| 30 minutes | 300 | 650 | 1890 | 5400 |
| 45 minutes | 300 | 680 | 1870 | 5500 |
| After a quiescent period of 24 hours | 290 | 670 | 1825 | 5460 |
| Observation after 5 minutes | Heterogeneous mixture of water and coarse floccules or agglomerates. | | | |
| Observation after 10 minutes | Onset of coarse, opalescent floccules. | | | |
| Observation after 30 minutes | Still some floccules; homogeneous medium | | | |

A comparative analysis of Tables I and II evidences the following:

(i) With Composition 1, in any concentration but less than 0.2%, maximum viscosity is attained as a practical matter in 5 minutes, while in the case of the Xanthan gum alone, it was necessary to wait 30 minutes.

The dispersion of the subject composition was good and only a few, rare floccules appeared when the powder was added rapidly, but same disappeared rather quickly.

(ii) With Composition 2, about 10 minutes were required to obtain total swelling; which is still abundantly favorable with respect to the Xanthan gum alone.

The dispersion was excellent, but a suspension of fine white particles was observed, because of the higher silica content of this formula. Consequently, when such a composition is selected for use, care must be taken that the suspension does not interfere with the intended end application.

Under the same conditions, the Xanthan gum sol was, after 5 minutes, a heterogeneous mixture filled with agglomerates and practically without viscosity; it was necessary to wait 30 minutes in order to obtain a nearly homogeneous medium which had attained its ultimate viscosity.

The comparison of the sols of these two compositions with that of Xanthan gum after 24 hours at rest or quiescence, i.e., at equilibrium, demonstrated that the two compositions yield, at an equal concentration in Xanthan gum, slightly higher viscosities:

(1) Composition 1: +8 to 12%
(2) Composition 2: +15 to 20%

Up to 10%, it is considered that one is within the limits of accuracy and reproducibility of the measurements. Thereafter, it may be assumed that the filler, which is important especially in the case of Composition 2, contributes to a slight increase in viscosity.

(b) Comparison of rheological behavior:

The plotting of rheogram curves evidenced the rheological behavior of the sols obtained from Compositions 1 and 2, and enabled verification that with this formulation the rheological behavior of Xanthan gum was not modified.

The rheograms were plotted with the aid of a Rheomat 30 rheometer after 24 hours.

These curves enabled calculation of critical stress at the threshold of flow, and viscosities at different velocity gradients.

Tables III and IV report the entirety of the test

TABLE III

| Measurements of critical stress at the threshold of flow in Pa and of viscosities in mPa.s (RHEOMAT 30 viscosimeter) at two velocity gradients | | | | | | | | |
|---|---|---|---|---|---|---|---|---|
| REFERENCES | COMPOSITION 1 | | | | COMPOSITION 2 | | | |
| Concentration in Xanthan gum | 0.2% | 0.3% | 0.5% | 1% | 0.2% | 0.3% | 0.5% | 1% |
| Threshold stress in Pa | 0.25 | 1.2 | 3.3 | 12.4 | 0.3 | 1.0 | 3.8 | 13.6 |
| Viscosity in mPa.s at 2.78 s$^{-1}$ | 428 | 950 | 2315 | 7030 | 428 | 860 | 2570 | 7070 |
| Viscosity in mPa.s at 278 s$^{-1}$ | 15 | 25 | 45 | 115 | 15 | 25 | 48 | 120 |

TABLE IV

| Measurements of critical stress at the threshold of flow in Pa and of viscosities in mPa.s (RHEOMAT 30 viscosimeter) at two velocity gradients | | | | |
|---|---|---|---|---|
| REFERENCE | XANTHAN GUM | | | |
| Xanthan gum concentration | 0.2% | 0.3% | 0.5% | 1% |
| Threshold stress in Pa | 0.2 | 0.7 | 3.2 | 10.7 |
| Viscosity in mPa.s at 2.78 s$^{-1}$ | 364 | 730 | 2315 | 6260 |
| Viscosity in mPa.s at 278 s$^{-1}$ | 15 | 23 | 45 | 103 |

A comparison of the rheograms for the two compositions and for the Xanthan gum alone (Tables III and IV) demonstrated that:

(i) The subject compositions had a flow threshold (δ) of the same order of magnitude as that of the Xanthan gum and were well adapted for rapid, effective dispersion/dissolution;

(ii) At low shearing, 2.78 s$^{-1}$, and at equal concentrations, the compositions yield a slightly higher viscosity;

(iii) At a high viscosity gradient, 278 s$^{-1}$, and at equal concentrations, the compositions always yield solutions slightly higher in viscosity; and (iv) The presence of a filler in Compositions 1 and 2 does not impart thixotropy to the product solutions.

In conclusion, the overall results demonstrated that Xanthan gum formulated into the compositions of the invention was unchanged as regards its rheological properties, and the dissolution thereof in aqueous media was clearly markedly enhanced.

EXAMPLES 3 to 6.

In the following examples, a higher proportion of Xanthan gum was used in the compositions of the invention.

(1) Preparation of compositions based upon Xanthan gum

Compositions containing Xanthan gum, a precipitated silica and sodium diisopropylnaphthalene sulfonate and water, were prepared in the following proportions:

| | COMPOSITION 3 | COMPOSITION 4 | COMPOSITION 5 | COMPOSITION 6 |
|---|---|---|---|---|
| Xanthan gum (Rhodopol 23) | 40% | 50% | 60% | 70% |
| Precipitated silica (Tixosil 38A) | 18.35% | 15% | 11.65% | 8.35% |
| Sodium diisopropyl-naphthalene sulfonate (Supragil WP) | 5% | 5% | 5% | 5% |
| Water | 36.65% | 30% | 23.35% | 16.65% |

The Xanthan gum content varied from 40 to 70%, the silica/water ratio was constant at 0.5 and the amount of sodium diisopropylnaphthalenesulfonate was maintained at 5%.

The characteristics of the product compositions were as set forth in Examples 1 and 2.

(2) Preparation of the sols

For each experiment, 400 g of a sol having a constant Xanthan gum content of 0.5% were prepared.

(3) Viscosity measurements

The viscosities of the sols prepared from Compositions 3, 4, 5 and 6 were measured at 23° C. after 5, 10, 15, 20, 30 and 60 minutes, with a Brookfield Model RV viscosimeter at a velocity of 10 rpm and with a No. 2 plunger.

The values obtained are reported in Table V.

With the same amount of Xanthan gum concentration, dissolution and increase in viscosity were, respectively:

(a) the easiest and most rapid for Composition 1 (Example 1); and (b) the most difficult and slowest for the Xanthan gum alone.

The four compositions investigated had an intermediate behavior, with the best and the closest to Composition 1 being Composition 3, then 4, 5 and finally 6, which approaches Xanthan gum alone, but, in all cases, the compositions according to the invention afforded improved results.

TABLE V

Measurements of viscosities in mPa.s (BROOKFIELD Model RV Viscosimeter - 10 rpm - No. 2 Plunger) of 0.5% sols

| REFERENCES | COMPOSITION 3 | COMPOSITION 4 | COMPOSITION 5 | COMPOSITION 6 | XANTHAN GUM |
|---|---|---|---|---|---|
| Duration of Agitation | | | | | |
| 5 minutes | 1740 | 1424 | 1164 | 780 | not measurable |
| 10 minutes | 1960 | 1668 | 1540 | 1130 | 195 |
| 15 minutes | 2000 | 1848 | 1780 | 1380 | 565 |
| 20 minutes | 1960 | 1910 | 1924 | 1640 | 1050 |
| 30 minutes | 1970 | 1930 | 1920 | 1730 | 1325 |
| 60 minutes | 2010 | 1950 | 1940 | 1790 | 1460 |

EXAMPLES 7 to 14

The following examples illustrate the effects of varying the Xanthan gum/water ratio which result regardless of the amount of silica present.

(1) Preparation of compositions based upon Xanthan gum

Eight new compositions were prepared following that general procedure above-described, i.e., the Compositions 7 to 14:

| | COMP. 7 | COMP. 8 | COMP. 9 | COMP. 10 | COMP. 11 | COMP. 12 | COMP. 13 | COMP. 14 |
|---|---|---|---|---|---|---|---|---|
| Xanthan gum (Rhodopol 23) | 50 | 60 | 50 | 50 | 40 | 50 | 60 | 60 |
| Precipitated silica (Tixosil 38A) | 11.25 | 8.75 | 15 | 30 | 39.45 | 25.55 | 11.65 | 7.75 |
| Sodium diisopropyl-naphthalene sulfonate (Supragil WP) | 5 | 5 | 5 | 5 | 5 | 5 | 5 | 5 |
| Water | 33.75 | 26.25 | 15 | 15 | 15.55 | 19.45 | 23.35 | 27.25 |

(2) Preparation of the sols

Sols containing said Compositions 7 to 14 were prepared in quantities such that the concentration of Xanthan gum therein was constant and equal to 0.5%.

(3) Viscosity measurements

The viscosity of sols prepared from the Compositions 7 to 14 was measured after 5, 10, 15, 30 and 60 minutes, with a Brookfield Model RV viscosimeter at a velocity of 10 rpm and with a No. 2 plunger.

The results obtained are reported in Table VI; those obtained with the Compositions 3 to 6 are repeated:

TABLE VI

Measurements of viscosities in mPa.s (BROOKFIELD Model RV Viscosimeter - 10 rpm - Plunger No. 2) of 0.5% sols

| REFERENCES | COMP. 3 | COMP. 4 | COMP. 5 | COMP. 6 | COMP. 7 | COMP. 8 | COMP. 9 |
|---|---|---|---|---|---|---|---|
| % of Xanthan gum in composition | 40 | 50 | 60 | 70 | 50 | 60 | 50 |
| Xanthan gum/water ratio | 1.1 | 1.7 | 2.6 | 4.2 | 1.5 | 2.3 | 3.3 |
| Silica/water | 0.5 | 0.5 | 0.5 | 0.5 | 0.33 | 0.33 | 1 |
| Duration of agitation | | | | | | | |
| 5 minutes | 1740 | 1424 | 1164 | 780 | 1600 | 1424 | 950 |
| 10 minutes | 1960 | 1668 | 1540 | 1130 | 1904 | 1720 | 1420 |
| 15 minutes | 2000 | 1848 | 1780 | 1380 | 1920 | 1848 | 1712 |
| 20 minutes | 1960 | 1910 | 1924 | 1640 | 1980 | 1870 | 1820 |
| 30 minutes | 1970 | 1930 | 1920 | 1730 | 1980 | 1870 | 1860 |
| 60 minutes | 2010 | 1950 | 1940 | 1790 | 2000 | 1904 | 1884 |

| REFERENCES | COMP. 10 | COMP. 11 | COMP. 12 | COMP. 13 | COMP. 14 | Xanthan gum |
|---|---|---|---|---|---|---|
| % of Xanthan gum in composition | 50 | 40 | 50 | 60 | 60 | 100 |
| Xanthan gum/water ratio | 3.3 | 2.6 | 2.6 | 2.6 | 2.2 | — |
| Silica/water | 2 | 2.5 | 1.3 | 0.5 | 0.28 | — |
| Duration of agitation | | | | | | |
| 5 minutes | 724 | 1020 | 1020 | 1232 | 1408 | not measurable |
| 10 minutes | 1200 | 1428 | 1410 | 1668 | 1792 | 195 |
| 15 minutes | 1540 | 1736 | 1750 | 1870 | 1860 | 565 |
| 20 minutes | 1844 | 1930 | 1930 | 1960 | 1940 | 1050 |
| 30 minutes | 1896 | 1980 | 1984 | 1960 | 1924 | 1325 |
| 60 minutes | 1988 | 2024 | 2024 | 2000 | 1960 | 1460 |

After 5 minutes of agitation, it was determined that the compositions in which the quantity of water was the greatest for the same amount of Xanthan gum, solubilized the easiest and provided the highest viscosity.

It will be appreciated that when the Xanthan gum/water ratio varied from 3.3 to 2.3, the increase in viscosity was very large after 5 minutes of agitation, from 700 mPa·s to 1400 mPa·s; a gain of 100%.

Below a ratio of 2.5, the increase was clearly less and became negligible after 20 minutes.

To formulate a composition having the highest possible content in Xanthan gum and the maximum of water, it is necessary to introduce a minimum amount of silica, and thus much water and but little silica. In fact, the maximum amount of water that it has been possible to sorb onto the silica was three times its weight in water, if the appearance of the final product as a dry, flowable powder without agglomerates, was to be preserved.

With a silica/water ratio of 0.28, the powder was too moist, formed agglomerates and there was no enhancement in dispersion and the rate of dissolution.

(4) Stability studies

The stability of the "powder" compositions and of the sols prepared therefrom was examined during extended storage periods.

(a) Stability of "powder" compositions:

The compositions were maintained at an ambient temperature of 23° C. in polyethylene bottles.

The aforedescribed compositions 4 to 8 were tested.

After a storage time of 24 hours, 20 days (Composition 8), 30 days (Composition 4) and 60 days, sols containing 0.5% of the Compositions 4 and 8 were prepared.

The viscosity obtained was measured 30 minutes after the preparation of the sols, with a Brookfield, Model RV viscosimeter, at a velocity of 10 rpm and with a No. 2 plunger.

The following results were obtained; storage durations are expressed in hours (h) and days (j).

| REFERENCES | COMPOSITION 4 | | | COMPOSITION 8 | | |
| --- | --- | --- | --- | --- | --- | --- |
| Duration of storage | 24 h | 30 j | 60 j | 24 h | 20 j | 60 j |
| Viscosity in mPa.s | 2000 | 1930 | 1910 | 1870 | 1890 | 1910 |

It was noted that the appearance of the compositions remains unchanged and same retained their effectiveness even after two months of storage.

(b) Stability of sols:

From the Compositions 7 and 8, sols were prepared in the usual manner and were maintained in closed containers, in a room maintained at 23° C.

The viscosity was measured after storage periods of 1 hour, 20 days and 56 days under the conditions described under (a).

The following results were obtained; storage periods are expressed in hours (h) and days (j).

| REFERENCES | COMPOSITION 7 | | | COMPOSITION 8 | | |
| --- | --- | --- | --- | --- | --- | --- |
| Duration of storage | 1 h | 20 j | 56 j | 1 h | 20 j | 56 j |
| Viscosity in mPa.s | 2000 | 1960 | 1920 | 1870 | 1920 | 1860 |

The stability of the sols was very good, the more so since no preservative had been added; no odor or moisture was detected after 56 days of storage.

EXAMPLES 15 to 18

The following examples demonstrate the effects of the proportions of surfactant in the compositions according to the invention.

(1) Preparation of compositions based upon Xanthan gum

Compositions 15-18 containing Xanthan gum, a precipitated silica, water and the surfactant, sodium diisopropylnaphthalene sulfonate, in increasing amounts, were prepared as follows:

| | COMPOSITION 15 | COMPOSITION 16 | COMPOSITION 17 | COMPOSITION 18 |
| --- | --- | --- | --- | --- |
| Xanthan gum (Rhodopol 23) | 62.5 | 64 | 62 | 60 |
| Precipitated silica (Tixosil 38A) | 9.38 | 8.75 | 8.75 | 8.75 |
| Sodium diisopropylnaphthalene sulfonate (Supragil WP) | 0 | 1 | 3 | 5 |
| Water | 28.12 | 26.25 | 26.25 | 26.25 |

The content in sodium diisopropylnaphthalene sulfonate varied from 0 to 5%.

The silica and water were present in the constant ratio of 0.33.

The contents in Xanthan gum and the mixture of silica and water were determined in a manner such that the gum/water ratio was equal to, or close as possible to 2.2.

The compositions were formulated according to the general technique above-described.

(2) Preparation of the sols

Subsequently, the sols were prepared from the Compositions 15 to 18 in quantities such that the concentration in Xanthan gum therein was constant and equal to 0.5%.

(3) Viscosity measurements

The viscosity of the sols prepared from the Compositions 15 to 18 was measured after 5, 10, 15, 20 and 30 minutes with a Brookfield, Model RV viscosimeter at a velocity of rpm and with a No. 2 plunger.

The results obtained are reported in Table VII.

TABLE VII

Measurements of viscosities in mPa.s (BROOKFIELD Model RV Viscosimeter - 10 rpm - No. 2 plunger of 0.5% sols

| REFERENCES | COMPOSITION 15 | COMPOSITION 16 | COMPOSITION 17 | COMPOSITION 18 | Xanthan gum |
| --- | --- | --- | --- | --- | --- |
| % Of sodium diisopropylnaphthalene sulfonate in the composition | 0 | 1 | 3 | 5 | 0 |
| Duration of agitation | | | | | |
| 5 minutes | 1040 | 1200 | 1580 | 1600 | not measurable |
| 10 minutes | 1420 | 1540 | 1980 | 2000 | 195 |
| 15 minutes | 1680 | 1820 | 1990 | 2000 | 565 |
| 20 minutes | 1900 | 1900 | 1990 | 2000 | 1050 |
| 30 minutes | 1920 | 1920 | 1990 | 2000 | 1325 |

It will be appreciated that it is preferred to use sodium diisopropylnaphthalene sulfonate, because it improved viscosity. The presence of a surfactant was thus desirable. There is no advantage in employing an excess of sodium diisopropylnaphthalene sulfonate, as an amount of 3% appears to be sufficient to rapidly obtain the maximum viscosity.

EXAMPLES 19 to 21

The following examples illustrate the use of other surfactants.

(1) Preparation of compositions based upon Xanthan gum

The compositions of the preceding examples were prepared using sodium diisopropylnaphthalene sulfonate (Supragil WP) as the surfactant, which is a powder product having a low wetting strength of 4.1 g/l at 20° C., determined by the standard method NFT 73 406 (French National Standard).

(3) Viscosity measurements

The viscosity of sols prepared from the subject compositions was measured after 5, 10, 15, 20, 30 and 60 minutes with a Brookfield Model RV viscosimeter at a velocity of 10 rpm and with a No. 2 plunger.

The results obtained are reported in Table VIII; for comparison, the results obtained with sodium diisopropylnaphthalene sulfonate in Examples 17 and 18 were repeated.

The compositions tested with the surfactants having good wetting strength yield results better than those obtained in their absence, but they remain clearly below those obtained with sodium diisopropylnaphthalene sulfonate.

TABLE VIII

Measurements of viscosities in mPa.s (BROOKFIELD Model RV Viscosimeter - 10 rpm - No. 2 plunger) of 0.5% sols

| REFERENCES | COMP. 17 | COMP. 18 | COMP. 19 | COMP. 20 | COMP. 21 | Xanthan gum |
|---|---|---|---|---|---|---|
| % Surfactant in the composition | 3 | 5 | 3 | 5 | 2 | 0 |
| Duration of agitation | | | | | | |
| 5 minutes | 1580 | 1620 | 1240 | 1360 | 1120 | not measurable |
| 10 minutes | 2000 | 1980 | 1600 | 1740 | 1460 | 195 |
| 15 minutes | 1980 | 1980 | 1840 | 1880 | 1640 | 565 |
| 20 minutes | 1980 | 2000 | 1980 | 1940 | 1860 | 1050 |
| 30 minutes | 2000 | 2000 | 1980 | 1960 | 1900 | 1325 |
| 60 minutes | 2000 | 2000 | 2000 | 1980 | 1980 | 1460 |

Hereinafter, the following liquid surfactants were used:

(i) an Alfol 10-12, 7 O.E., 5 O.P.: i.e., a mixture of linear primary alcohols having 10 and 12 carbon atoms and condensed with 7 mols of ethylene oxide and 5 mols of propylene oxide (Cemulsol FM 33)=a nonionic surfactant with a wetting strength of 0.70 g/l; and (ii) sodium dioctylsulfosuccinate (Celanol DOS 63) in solution in isopropanol: a liquid anionic surfactant having a strong wetting strength of 0.30 g/l.

The formulation of compositions of the invention was effected by taking into consideration the wetting strength of the surfactant in the determination of its concentration.

| | COMPOSITION 19 | COMPOSITION 20 | COMPOSITION 21 |
|---|---|---|---|
| Xanthan gum (Rhodopol 23) | 60 | 56.7 | 62 |
| Precipitated silica (Tixosil 37A) | 10.75 | 12.05 | 8.75 |
| Alfol 10-12, 7 O.E., 5 O.P. (Cemulsol FM 33) | 3 | 5 | |
| Sodium dioctylsulfosuccinate (Celanol DOS 65) | | | 2 |
| Isopropanol | | | 1 |
| Water | 26.25 | 26.25 | 26.25 |

The compositions were formulated as aforesaid, except that the liquid surfactant was sorbed onto the silica under the same conditions as the water, prior to the addition of the Xanthan gum.

(2) Preparation of the sols

The sols were prepared from the Compositions 19 to 21 in quantities such that the concentration therein of the Xanthan gum was constant and equal to 0.5%.

EXAMPLES 22 to 30

The following examples illustrate the use of other materials incorporating water into the subject compositions.

(1) Preparation of compositions based upon Xanthan gum

All of the compositions prepared with the different materials (except with the hydrated silica gels) included:

(i) 60% Xanthan gum (Rhodopol 23);
(ii) 17.5% of water donor;
(iii) 5% sodium diisopropylnaphthalene sulfonate (Supragil WP); and
(iv) 17.5% water When the water donor was a hydrated silica gel, the composition had the following formulation:

(i) 60% Xanthan gum (Rhodopol 23);
(ii) 35% hydrated silica gel; and
(iii) 5% sodium diisopropylnaphthalene sulfonate (Supragil WP).

Hereinafter, at least one example of each category of the water donor materials is given:

(a) Hydrated silica gel (A) containing 68% water and having a BET surface of 600 m²/g;

(b) Hydrated silica gel (B) containing 86% water and having a BET surface of 600 m²/g;

(c) Dehydrated silica gel having a BET surface of 380 m²/g and a pore volume of 1 cm³/g (Spherosil);

(d) Alumina hydrate (C) having a BET surface of approximately 300 to 350 m²/g, a pore volume of 0.7 to 0.8 cm³/g and an average particle diameter of 10μ (Alumina SCP 350);

(e) Alumina hydrate (D) having a BET surface of 200 m²/g, a pore volume of 0.6 cm³/g and an average particle diameter of 15μ (Alumina Condea);

(f) Hydrargillite SH 5: natural alumina hydrate having a BET surface of 5 m$^2$/g;

(g) Attapulgite: argilla from Senegal;

(h) Bentonite having an average particle of 1 to 5μ; and (i) Zeolite 4A: synthetic zeolite of sodium type, having a BET surface of 3 to 4 m$^2$/g, a pore volume of 0.2 cm$^3$/g and an average particle diameter of 4μ (zeolite 4A SLD No. 9).

These compositions according to the invention were also prepared as described above.

(2) Preparation of the sols

Sols were prepared from the Compositions 22 to 30 in quantities such that the concentration of Xanthan gum therein was constant, and equal to 0.5%.

(3) Viscosity measurements

The viscosity of the sols prepared from the Compositions 22 to 30 was measured after 5, 10, 15, 20 and 30 minutes, with a Brookfield Model RV viscosimeter at 10 rpm and with a plunger No. 2.

The results obtained are reported in Table IX.

Without being as efficient as the finely precipitated silica (Tixosil 38), the "other" water donors tested enhanced, to varying degrees, the development of viscosity due to the Xanthan gum.

(i) 60% Xanthan gum (Rhodopol 23);

(ii) 35% of a hydrated salt; and (iii) 5% of sodium diisopropylnaphthalene sulfonate (Supragil WP).

The following salts were used:

(a) Sodium sulfate decahydrate: $Na_2SO_4.10H_2O$;

(b) Sodium carbonate decahydrate: $Na_2CO_3.10H_2O$;

(c) Sodium phosphate dodecahydrate: $Na_3PO_4.12H_2O$;

(d) Sodium acetate trihydrate: $NaC_2H_3O_2.3H_2O$;

(e) Sodium citrate pentahydrate: $Na_3C_6H_5O_7.5.5H_2O$;

(f) Calcium chloride hexahydrate: $CaCl_2.6H_2O$;

(g) Calcium lactate pentahydrate: $Ca(C_3H_5O_3)_2.5H_2O$;

(h) Magnesium chloride hexahydrate: $MgCl_2.6H_2O$; and (i) Magnesium nitrate hexahydrate: $Mg(NO_3)_2.6H_2O$ These compositions according to the invention were prepared as above-described, except that the stage of water impregnation was eliminated.

(2) Preparation of sols

Sols were prepared from the Compositions 31 to 39 in quantities such that the concentration of Xanthan gum therein was constant and equal to 0.5%.

TABLE IX

Measurements of viscosities in mPa.s (BROOKFIELD Model RV viscosimeter - 10 rpm - No. 2 plunger) of 0.5% sols

| REFERENCES | COMPOSITION 22 | COMPOSITION 23 | COMPOSITION 24 | COMPOSITION 25 | COMPOSITION 26 |
|---|---|---|---|---|---|
| Nature of water donor | Hydrated silica gel (A) | Hydrated silica gel (B) | Dehydrated silica gel (Spherosil) | Alumina hydrate (C) | Alumina hydrate (D) |
| Duration of agitation | | | | | |
| 5 minutes | 540 | 1160 | 720 | 160 | 220 |
| 10 minutes | 1180 | 1600 | 1300 | 540 | 720 |
| 15 minutes | 1800 | 1800 | 1640 | 1020 | 1220 |
| 20 minutes | 1920 | 1900 | 1850 | 1480 | 1660 |
| 30 minutes | 1900 | 1960 | 1920 | 1620 | 1820 |
| REFERENCES | COMPOSITION 27 | COMPOSITION 28 | COMPOSITION 29 | COMPOSITION 30 | Xanthan gum |
| Nature of water donor | Hydrargillite | Attapulgite | Bentonite | Zeolite 4A | none |
| Duration of agitation | | | | | |
| 5 minutes | 140 | 860 | 350 | 390 | not measurable |
| 10 minutes | 450 | 1360 | 940 | 790 | 195 |
| 15 minutes | 780 | 1640 | 1210 | 1120 | 565 |
| 20 minutes | 1120 | 1810 | 1440 | 1520 | 1050 |
| 30 minutes | 1720 | 1900 | 1760 | 1850 | 1325 |

EXAMPLES 31 to 39

The following examples demonstrate the use of hydrated salts as the water donors.

(1) Preparation of compositions based upon Xanthan gum

All of the compositions prepared were formulated as follows:

(3) Viscosity measurements

The viscosity of the sols prepared from the Compositions 31 to 39 was measured after 5, 10, 15, 20 and 30 minutes, with a Brookfield Model RV viscosimeter at 10 rpm and with a No. 2 plunger.

The results obtained are reported in Table X; the Xanthan gum/water and salt/water ratios are by weight.

TABLE X

Measurements of viscosities in mPa.s (BROOKFIELD Model RV viscosimeter - 10 rpm - No. 2 plunger) of 0.5% sols

| REFERENCES | COMPOSITION 31 | COMPOSITION 32 | COMPOSITION 33 | COMPOSITION 34 | COMPOSITION 35 |
|---|---|---|---|---|---|
| Nature of water donor | $Na_2SO_4.10H_2O$ | $Na_2CO_3.10H_2O$ | $Na_3PO_4.12H_2O$ | $NaC_2H_3O_2.3H_2O$ | $Na_3C_6H_5O_7.5.H_2O$ |
| Xanthan gum/water | 3.1 | 2.8 | 3.0 | 4.3 | 6.25 |
| Salt/water | 0.8 | 0.6 | 0.75 | 1.5 | 2.6 |
| Duration of agitation | | | | | |
| 5 minutes | 820 | 780 | 640 | 740 | 740 |
| 10 minutes | 1240 | 1100 | 1020 | 1540 | 1400 |

TABLE X-continued

Measurements of viscosities in mPa.s (BROOKFIELD Model RV viscosimeter - 10 rpm - No. 2 plunger) of 0.5% sols

|  |  |  |  |  |  |
|---|---|---|---|---|---|
| 15 minutes | 1440 | 1220 | 1200 | 1660 | 1560 |
| 20 minutes | 1550 | 1300 | 1320 | 1700 | 1680 |
| 30 minutes | 1700 | 1480 | 1500 | 1800 | 1760 |
| REFERENCES | COMPOSITION 36 | COMPOSITION 37 | COMPOSITION 38 | COMPOSITION 39 | Xanthan gum |
| Nature of water donor | $CaCl_2.6H_2O$ | $Ca(C_3H_5O_3)_2.5H_2O$ | $MgCl_2.6H_2O$ | $Mg(NO_3)_2.6H_2O$ | — |
| Xanthan gum/water | 3.6 | 5.9 | 3.2 | 4.2 | — |
| Salt/water | 1.0 | 2.4 | 0.9 | 1.4 | |
| Duration of agitation | | | | | |
| 5 minutes | 200 | 680 | 260 | 500 | 0 |
| 10 minutes | 960 | 1260 | 820 | 1160 | 240 |
| 15 minutes | 1370 | 1540 | 1160 | 1540 | 670 |
| 20 minutes | 1600 | 1660 | 1380 | 1700 | 1000 |
| 30 minutes | 1740 | 1800 | 1460 | 1840 | 1350 |

All of the hydrated salts tested resulted in a clear improvement in the rate of dissolution and swelling, with respect to Xanthan gum alone.

The following conclusions are thus reached from the examples:

(i) The combination of Xanthan gum with a water donor improved the rate of dissolution of Xanthan gum and the speed of attainment of maximum viscosity;

(ii) The addition of a surfactant further improved the speed of development of maximum viscosity;

(iii) The preferred composition was the following:
(a) 60% Xanthan gum;
(b) 8.75% finely precipitated silica;
(c) 5% sodium diisopropylnaphthalene sulfonate; and
(d) 26.25% water.

The FIGURE of Drawing illustrates the variation in viscosity of the respective sols, measured at 10 rpm as a function of duration of agitation:

(i) With the preferred composition of the invention (Curve 1);

(ii) With the same composition, but without the surfactant (Curve 2); and (iii) With Xanthan gum alone (Curve 3).

In these three cases, the concentration of the Xanthan gum was constant and equal to 0.5%. The superiority of the results obtained with the compositions of the invention is thus confirmed.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A composition of matter adapted for ready dispersion/dissolution in an aqueous medium, comprising an intimate admixture of from 30 to 70% by weight of a water soluble biogum heteropolysaccharide, from 7 to 40% by weight of a dispersion/dissolution enhancing water donor material therefor, from 15 to 37% by weight of water and from 0–10% by weight of an anionic or nonionic surfactant.

2. The composition of matter as defined by claim 1, said biogum heteropolysaccharide comprising product of fermentation of a carbohydrate with bacteria of the genera *Xanthomonas* or *Arthrobacter*, or with fungi of the genus *Sclerotium*.

3. The composition of matter as defined by claim 2, said biogum heteropolysaccharide comprising product of fermentation of a carbohydrate with *Xanthomonas begoniae, Xanthomonas campestris, Xanthomonas carotea, Xanthomonas hederae, Xanthomonas incanae, Xanthomonas malvacearum, Xanthomonas papavericola, Xanthomonas phaseoli, Xanthomonas pisi, Xanthomonas vasculorum, Xanthomonas vesicatoria, Xanthomonas vitians, Xanthomonas pelargonii, Arthrobacter stabilis, Arthrobacter viscosus, Sclerotium glucanicum* or *Sclerotium rolfsii.*

4. The composition of matter as defined by claim 3, said biogum heteropolysaccharide comprising product of fermentation of a carbohydrate with *Xanthomonas begoniae, Xanthomonas campestris, Xanthomonas incanae* or *Xanthomonas pisi.*

5. The composition of matter as defined by claim 4, said biogum heteropolysaccharide comprising product of fermentation of a carbohydrate with *Xanthomonas campestris.*

6. The composition of matter as defined by claim 1, said biogum heteropolysaccharide comprising a Xanthan gum.

7. The composition of matter as defined by claim 1, said water donor comprising a finely divided silica, a hydrated silica gel, a dehydrated silica gel, an alumina hydrate, an argilla, a natural or synthetic zeolite, or a hydrate of an inorganic or organic salt.

8. The composition of matter as defined by claim 1, said water donor comprising a hydrate of at least one sodium, potassium, calcium or magnesium carbonate, halide, nitrate, phosphate, silicate, sulfate, acetate, citrate, lactate, laurate or tartrate, or mixture thereof.

9. The composition of matter as defined by claim 1, said water donor comprising a finely divided silica having a BET surface of 200 to 400 $m^2/g$ and a particle diameter ranging from 200 to 800 Å, a hydrated silica gel, a dehydrated silica gel, an alumina hydrate, a hydrargillite, a bentonite, an attapulgite, a zeolite 4A, sodium sulfate decahydrate, sodium carbonate decahydrate, sodium phosphate dodecahydrate, sodium acetate trihydrate, sodium citrate pentahydrate, calcium chloride hexahydrate, calcium lactate pentahydrate, magnesium chloride hexahydrate or magnesium nitrate hexahydrate.

10. The composition of matter as defined by claim 1, said water donor comprising a finely divided silica capable of sorbing 2 to 3 times its weight of water.

11. The composition of matter as defined by claim 1, further comprising an anionic or nonionic surfactant, or mixture thereof.

12. The composition of matter as defined by claim 11, said surfactant comprising an alkali metal soap, an alkali sulfonate, a sulfate or sulfated compound, an alkaline phosphate, a polyalkylene alkylphenol, an aliphatic polyoxyalkylene alcohol, a fatty amide, or a polyoxyethylene or polyoxypropylene compound, or mixture thereof.

13. The composition of matter as defined by claim 12, said surfactant comprising a sodium alkylsulfosuccinate, a sodium alkylnaphthalene sulfonate, or a sulfonated olefin.

14. The composition of matter as defined by claim 13, said surfactant comprising sodium diisopropylnaphthalene sulfonate.

15. The composition of matter as defined by claim 1, the same comprising an amount of water such that the ratio by weight of the biogum heteropolysaccharide thereto ranges from 6.5 to 1.

16. The composition of matter as defined by claim 15, wherein the ratio by weight of the water donor to the water therein ranges from 0.3 to 2.6.

17. The composition of matter as defined by claim 11, wherein the ratio by weight of the surfactant thereto is no greater than 0.10.

18. The composition of matter as defined by claim 1, said water donor comprising bound water.

19. The composition of matter as defined by claim 1, said water donor comprising water of crystallization.

20. The composition of matter as defined by claim 1, said water donor comprising sorbed water.

21. The composition of matter as defined by claim 1, said water donor adapted to sorb and retain water from an external aqueous medium.

22. The composition of matter as defined by claim 1, comprising a free-flowing powder.

23. The composition of matter as defined by claim 1, comprising from 50 to 60% by weight of the water soluble biogum heteropolysaccharide; from 8 to 15% by weight of the water donor; from 3 to 7% by weight of the surfactant; and from 24 to 36% by weight of water.

24. A sol comprising dispersion/solution of the composition of matter as defined by claim 1, in an aqueous medium.

25. The sol as defined by claim 24, comprising from 0.2 to 2% by weight of said biogum heteropolysaccharide.

* * * * *